(12) United States Patent
Hupperich et al.

(10) Patent No.: US 10,690,985 B2
(45) Date of Patent: Jun. 23, 2020

(54) VEHICLE DEVICE AND METHOD USING A VEHICLE DEVICE

(71) Applicant: E.I.S. Aircraft Products and Services GmbH, Euskirchen (DE)

(72) Inventors: Gerold Karl Hupperich, Dahlem (DE); Sven Achilles, Michelfeld (DE); Thomas Sturm, Zehnhausen (DE)

(73) Assignee: E.I.S. AIRCRAFT PRODUCTS AND SERVICES GMBH, Euskirchen (DE)

( * ) Notice: Subject to any disclaimer, the term of this patent is extended or adjusted under 35 U.S.C. 154(b) by 0 days.

(21) Appl. No.: 16/089,552

(22) PCT Filed: Mar. 31, 2017

(86) PCT No.: PCT/EP2017/057651
§ 371 (c)(1),
(2) Date: Sep. 28, 2018

(87) PCT Pub. No.: WO2017/167945
PCT Pub. Date: Oct. 5, 2017

(65) Prior Publication Data
US 2019/0331943 A1 Oct. 31, 2019

(30) Foreign Application Priority Data
Mar. 31, 2016 (DE) .................. 10 2016 105 894

(51) Int. Cl.
*G02F 1/137* (2006.01)
*B64C 1/14* (2006.01)
*F21V 8/00* (2006.01)

(52) U.S. Cl.
CPC ............ *G02F 1/137* (2013.01); *B64C 1/1492* (2013.01); *G02B 6/005* (2013.01); *G02B 6/0095* (2013.01)

(58) Field of Classification Search
None
See application file for complete search history.

(56) References Cited

U.S. PATENT DOCUMENTS 2,636,420 A * 4/1953 Ryan ................. B32B 17/10339
359/614
3,400,972 A * 9/1968 Woodward ........ B32B 17/10036
296/97.2

(Continued)

FOREIGN PATENT DOCUMENTS

DE       4319794 C2     9/1996
DE       19852593 A1    5/2000

(Continued)

OTHER PUBLICATIONS

German Search Report dated Dec. 13, 2016 issued in corresponding DE patent application No. 10 2016 105 894.7 (and partial English translation thereof).

(Continued)

*Primary Examiner* — Elmito Breval
(74) *Attorney, Agent, or Firm* — Posz Law Group, PLC

(57) ABSTRACT

A vehicle device, in particular an aircraft device, comprises at least one window unit and comprises at least one transparency switching unit that is, in at least one first operating state, configured to enable a through-view through the window unit, wherein the transparency switching unit comprises at least one illuminating unit that is configured to at least partly prevent a view through the window unit in at least one second operating state.

16 Claims, 3 Drawing Sheets

(56) References Cited

U.S. PATENT DOCUMENTS

Figure 1:
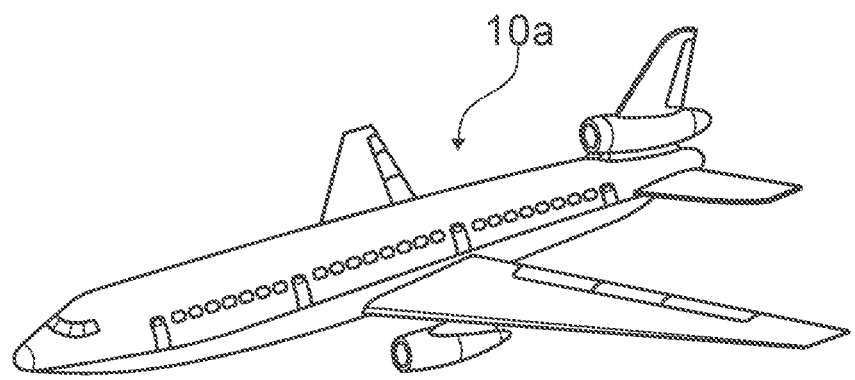

| | | | | |
|---|---|---|---|---|
| 4,396,259 A | * | 8/1983 | Miller | A61M 21/00 |
| | | | | 351/158 |
| 4,773,717 A | * | 9/1988 | Pai | C03C 17/36 |
| | | | | 359/589 |
| 5,271,580 A | | 12/1993 | Speelman | |
| 5,511,842 A | | 4/1996 | Dillon | |
| 9,776,478 B2 | * | 10/2017 | Dryselius | B60J 3/04 |
| 10,274,733 B2 | * | 4/2019 | Benesh | G02B 27/0172 |
| 2012/0241559 A1 | * | 9/2012 | Ebner | B64C 1/1492 |
| | | | | 244/129.3 |
| 2014/0176836 A1 | * | 6/2014 | Brecht | B32B 17/10036 |
| | | | | 349/16 |
| 2016/0052446 A1 | * | 2/2016 | Frey | G02F 1/1334 |
| | | | | 349/16 |
| 2017/0023806 A1 | * | 1/2017 | Wehlus | G02F 1/0126 |

FOREIGN PATENT DOCUMENTS

| | | |
|---|---|---|
| JP | 2009-053533 A | 3/2009 |
| JP | 2010-095156 A | 4/2010 |

OTHER PUBLICATIONS

International Preliminary Report on Patentability dated Oct. 11, 2018 issued in corresponding international patent application No. PCT/EP2017/057651.

International Search Report ("ISR") dated Jun. 30, 2017 issued in corresponding international patent application No. PCT/EP2017/057651.

* cited by examiner

VEHICLE DEVICE AND METHOD USING A VEHICLE DEVICE

CROSS REFERENCE TO RELATED APPLICATIONS

This application is a U.S. national stage application of PCT/EP2017/057651 filed on Mar. 31, 2017, which is based on German Patent Application No. 10 2016 105 894.7 filed on Mar. 31, 2016, the contents of which are incorporated herein by reference.

PRIOR ART

The invention relates to a vehicle device according to the preamble of claim 1 and to a method with a vehicle device according to the preamble of claim 15.

Vehicles with a window unit are known from the prior art, wherein in at least one operating state a view through the window unit is blocked by means of light blocking units, such as for example blinds and/or curtains.

Furthermore, an aircraft device with a window unit integrated in a partition wall is known from DE 43 19 794 C2, which comprises at least one transparency unit embodied as a liquid crystal film for controlling the transparency of the window unit.

It is in particular the object of the invention to provide a generic vehicle device with improved properties relating to flexibility. The object is achieved by the characterizing features of claims 1, 4, 12 and 15, whereas advantageous designs and developments of the invention can be obtained from the subordinate claims.

Advantages of the Invention

The invention relates to a vehicle device, in particular an aircraft device, with at least one window unit and with at least one transparency switching unit, which is, in at least one first operating state, configured to enable a view through the window unit, advantageously at least a de-energized state, in particular a zero current and/or zero voltage state.

It is proposed that the transparency switching unit comprises at least one illuminating unit that is configured in at least one second operating state to prevent a view through the window unit, at least partly and preferably at least to a large part. "Configured" shall in particular mean specifically programmed, designed and/or equipped. A statement that an object is configured for a certain function shall in particular be understood to mean that the object fulfils and/or performs said certain function in at least one application and/or operating state. Furthermore, the expression "at least to a large part" shall in particular be understood to mean at least 55%, advantageously at least 65%, preferably at least 75%, particularly preferably at least 85% and particularly advantageously at least 95%. In particular, in this case the illuminating unit is configured to prevent a view through the window unit at least in a sub region of the window unit, preferably in at least 55%, advantageously in at least 65%, preferably in at least 75%, particularly preferably in at least 85% and particularly advantageously in at least 95% of the total area of the window unit, and/or at least to a certain extent and/or percentage, preferably at least 55%, advantageously at least 65%, preferably at least 75%, particularly preferably at least 85% and particularly advantageously at least 95%, in the second operating state.

A "vehicle device" shall in this context mean in particular at least one portion, in particular a sub assembly, of a vehicle, in particular an aircraft. In this case, the vehicle device is furthermore advantageously, in particular specifically for use in a vehicle, advantageously a cabin of the vehicle. A "window unit" shall in particular be understood to mean a unit that is advantageously of a stable shape with at least one, in particular transparent, viewing pane. The window unit advantageously comprises at least two viewing panes, which are in particular at least substantially mutually parallel and preferably spaced apart. Advantageously in this case, a recess and/or an air-filled region is/are arranged between the viewing panes. "At least significantly parallel" shall be understood here to mean in particular orientation of a direction relative to a reference direction, in particular in a plane, wherein the direction has a deviation relative to the reference direction that is in particular smaller than 8°, advantageously smaller than 5° and particularly advantageously smaller than 2°.

Moreover, a "transparency switching unit" shall in particular be understood to mean a unit that has at least one working connection to the window unit and in particular is configured, in at least one operating state, to at least partly prevent the observation of the opposite side of the window unit. Particularly advantageously, the transparency switching unit is free of movable components. An "illuminating unit" shall further be understood to mean in particular a unit, in particular with at least one light source, which in particular is configured to emit light beams, advantageously in at least one defined and/or definable direction, in particular a light direction. Advantageously in this case, in particular the illuminating unit is configured to illuminate at least one, in particular optically active, object of the window unit and/or advantageously the transparency switching unit in order to at least partly prevent a view through the window unit. The illuminating unit is preferably configured to emit light in at least two, and advantageously at least three, different light colors. In this case the illuminating unit could correspond in particular to conventional vehicle interior illumination and in particular in addition to the illumination and/or lighting of the cabin of a vehicle. However, the illuminating unit is preferably different from an in particular conventional vehicle illumination and/or vehicle interior illumination and particularly preferably is specifically designed for preventing a view through the window unit. Owing to said design, a vehicle device can be provided with improved properties in relation to flexibility, in particular design flexibility. In addition, design complexity can advantageously be reduced. Moreover, the efficiency, in particular the component efficiency, the installation space efficiency, the energy efficiency and/or the cost efficiency can advantageously be improved.

The illuminating unit is preferably arranged in a proximity of the window unit. A "proximity" shall in particular be understood to mean a spatial region that is formed of points that are arranged at a distance of less than 80%, preferably less than 60%, preferably less than 40% and particularly preferably less than 20% of a length of a major dimension of the window unit from a reference point and/or a reference component, in particular the window unit, and/or that each is at a distance of no more than 80 cm, advantageously of no more than 50 cm, preferably of no more than 20 cm and particularly preferably of no more than 10 cm from a reference point and/or a reference component, in particular the window unit. In particular, this can result in the provision of an advantageously compact and/or installation space-efficient vehicle device.

In this case for example, the illuminating unit could be configured for at least substantially direct illumination of the window unit, in particular to produce a glare effect. In a preferred embodiment of the invention however, it is proposed that the illuminating unit is configured for the emission of light beams that are at least essentially parallel to a main extension plane of the window unit. In particular, the illuminating unit is configured for at least essentially indirect illumination of the window unit in this case. The illuminating unit is advantageously configured to radiate light beams into an edge region of the window unit. In this connection, a "main extension plane" of an object shall in particular be understood to mean a plane that runs parallel to a very large lateral surface of a very small, in particular imaginary, cube that just fully encloses the object, and in particular passes through a central point of the cube, in particular a geometric central point. As a result of this, in particular the user-friendliness and/or the operating safety are increased. In addition, appealing ambient lighting can advantageously be achieved.

The transparency switching unit could comprise at least one fluid unit for an at least partial prevention of a through-view through the window unit for example, which could advantageously comprise at least one, in particular optically active fluid, in particular a gas and/or a liquid, which advantageously interacts with light beams, advantageously of the illuminating unit, in the second operating state, for example by means of interference and/or light absorption. According to another aspect of the invention, which in particular can be implemented on its own or advantageously in addition with the mentioned aspects of the invention, and can preferably be combined with at least some, advantageously at least a large part and preferably all of the mentioned aspects, however, a vehicle device is proposed, in particular an aircraft device with at least one window unit and with at least one transparency switching unit, which is configured to enable a view through the window unit in at least one first operating state, advantageously at least one deenergized state, wherein the transparency switching unit comprises at least one optically active structural unit for an at least partial prevention of a view through the window unit. As a result, in particular the already mentioned advantages can be achieved. In particular, a vehicle device with improved properties in relation to flexibility, in particular design flexibility, can be provided with a suitable design. In addition, the design complexity can advantageously be reduced. Moreover, the efficiency, in particular the component efficiency, the installation space efficiency, the energy efficiency and/or the cost efficiency, can advantageously be improved. In particular in this case, a "structural unit" shall be understood to be advantageously a unit that is of an at least partly, preferably to at least a large extent and particularly preferably a fully stable form, which in particular comprises at least one structure element, which in particular is configured to interact with light beams. The structural unit is advantageously arranged at least partly, preferably to at least a large extent and particularly preferably fully between two viewing panes of the window unit. The structural element is advantageously embodied as an optically active structure in this case, advantageously a microstructure, and/or optics, advantageously micro optics. In particular, the structural unit and/or the structural element is/are different from a chemically and/or mechanically variable structure. The structural unit preferably comprises a number of preferably at least essentially identical structure elements. In particular in this case, the phrase "at least essentially identical" shall be understood to mean identical apart from manufacturing tolerances and/or in the context of manufacturing technology possibilities and/or in the context of standardized tolerances. In this case the structural unit could be configured to interact in the second operating state with light beams of an arbitrary radiation source and/or with light beams from an ambient region of the window unit. However, in particular the structural unit is advantageously configured to interact with light beams of the previously mentioned illuminating unit. In particular in this case, the illuminating unit is especially configured to illuminate the structural unit for an at least partial prevention of a view through the window unit.

In this case the structural unit could be configured to produce interference, in particular such that light beams passing through the window unit, in particular from a viewing area that can be viewed by means of the window unit, destructively interfere with other light beams, advantageously of the illuminating unit, in the second operating state. In an advantageous embodiment of the invention, it is however proposed that the structural unit is configured to influence a light direction of light beams, advantageously of the illuminating unit, whereby in particular an advantageously simple design can be achieved. In particular, the structural unit is configured to deflect light beams with at least a defined angle of incidence by an angle of at least 10°, preferably of at least 30° and particularly preferably of at least 50°, relative to the angle of incidence and/or by an angle of no more than 350°, preferably of no more than 320° and particularly preferably of no more than 290°, relative to the angle of incidence.

In a particularly preferable embodiment of the invention, it is proposed that the structural unit is configured to superimpose light beams passing through the window unit, in particular from a viewing area that can be viewed by means of the window unit, with light beams of the illuminating unit. In this case the structural unit is advantageously at least configured to deflect the light beams of the illuminating unit so that a light direction, in particular an exit direction, of the light beams of the illuminating unit is at least essentially identical to a light direction of light beams passing through the window unit. Particularly preferably, the structural unit is configured to deflect the first light beams passing through the window unit and/or the second light beams of the illuminating unit so that the exit directions of the first light beams and the second light beams are at least essentially identical to each other. As a result, in particular a solution can be provided that is structurally particularly simple and/or operationally safe.

Furthermore, it is proposed that the window unit and the transparency switching unit are embodied at least partly in one-part implementation, whereby in particular a vehicle device that is particularly installation space-efficient and/or stable can be provided. In particular, an object being "at least partly embodied in a one-part implementation" with another object shall be understood in this connection to mean that the objects comprise at least one common component and/or at least one component of the object and/or the object is embodied in a one-part implementation with at least one component of the other object and/or the other object. In particular, "embodied in a one-part implementation" shall be understood to mean in this context at least connected by substance-to-substance bond and/or formed together. The bonding can for example be produced by a gluing process, an injection process, a welding process, a soldering process and/or a different process. Advantageously, in one piece shall be understood to mean formed from one piece and/or in one piece. This is preferably a piece made from a single blank, a mass and/or a casting, such as for example in an extrusion method, in particular a single component and/or a multi-component extrusion method, and/or an injection molding method, in particular a single component and/or a multi-component injection molding method.

In a preferred embodiment of the invention, it is proposed that the window unit comprises at least one viewing pane, with which the structural unit is embodied at least partly in a one-part implementation. Advantageously in this case, the structural unit extends at least over a large extent of the viewing pane and particularly advantageously over the entire viewing pane. As a result, an advantageously compact construction can be achieved.

The vehicle device could for example comprise at least one storage unit, in particular a cupboard, a luggage rack and/or a kitchen segment, in which the window unit is at least partly and preferably fully integrated. Furthermore, it is proposed that the vehicle device comprises at least one partition wall, in particular that is at least partly opaque and advantageously different from a supporting structure of the vehicle, such as for example a floor, a ceiling, a side wall, a luggage rack and/or any other structural component of the vehicle in which the window unit is at least partly and preferably fully integrated. In particular in this case, a "partition wall" shall be understood to mean a unit that is in particular configured to at least partly disconnect and/or separate at least two regions from each other. In particular in this case, the partition wall is configured at least for spatial separation and advantageously for visual separation. As a result, in particular advantageous stability can be achieved. In addition, in particular an advantageous spatial separation can be achieved. Furthermore, advantageously installation space efficiency can be improved and/or user-friendliness can be increased.

Furthermore, it is proposed that the window unit comprises at least one viewing pane, in particular the already mentioned viewing pane, which extends over at least 20%, advantageously over at least 35%, preferably over at least 50% and particularly preferably over at least 70% of a top surface, in particular a main extension surface, of the partition wall, whereby in particular an advantageously large-area viewing region can be provided and in particular safety regulations can be fulfilled, in particular in a vehicle that is embodied as an aircraft. Alternatively or additionally, in a mounted state the viewing pane advantageously extends over at least 60%, advantageously over at least 70%, preferably over at least 80% and particularly preferably over at least 90% of a lateral extension of the partition wall.

In particular, an embodiment that is particularly installation space-efficient can be achieved if the illuminating unit is at least partly and preferably entirely integrated in the partition wall and/or particularly preferably in the window unit.

According to a further aspect of the invention, which in particular can be implemented on its own or advantageously in addition to the mentioned aspects of the invention, and preferably can be combined with at least some, advantageously at least a large part and preferably all of the mentioned aspects, a vehicle device is proposed, in particular an aircraft device, with at least one window unit and with at least one transparency switching unit, which is configured, in at least one first operating state, to enable a view through the window unit, advantageously at least one deenergized state, wherein the vehicle device comprises at least one partition wall, which is in particular at least partly opaque and is advantageously different from a supporting structure of the vehicle, such as for example a floor, a ceiling, a side wall, luggage rack and/or any further structural component of the vehicle, in which the window unit is at least partly and preferably entirely integrated and which comprises at least one frame unit and at least one separating unit that is arranged in at least one separating unit accommodation region of the frame unit. As a result, in particular the already mentioned advantages can be achieved. In particular, owing to a corresponding embodiment, a vehicle device with improved properties relating to flexibility, in particular design flexibility, can be provided. In addition, design complexity can advantageously be reduced. Moreover, an efficiency, in particular a component efficiency, an installation space efficiency, an energy efficiency and/or a cost efficiency can advantageously be improved. In particular in this connection, a "frame unit" shall be understood to mean a unit which in particular forms an at least partly supporting structure, in particular a frame structure, and in particular is configured to accommodate, retain, attach and/or guide the separating unit. In particular, the frame unit is configured to absorb at least a major part of the weight of the separating unit and/or dynamic forces of the separating unit, such as for example acceleration forces, in particular during operation of the vehicle, and/or externally acting forces, such as for example shock forces, and in particular when fitted to pass said forces into at least one supporting structure of the vehicle, such as for example a floor, a ceiling, a side wall, a luggage rack and/or any other structural component of the vehicle. In particular in this case, the frame unit at least partly surrounds and/or comprises the separating unit, preferably to at least a large extent and particularly preferably entirely. For this purpose, in particular the frame unit comprises at least one, preferably at least partly bar-shaped frame element, advantageously a side frame element and/or a transverse frame element. In this case the frame element can be embodied as a hollow profile and/or as a solid profile. The frame unit is advantageously different from a supporting structure of the vehicle, such as for example a floor, a ceiling, a side wall, a luggage rack and/or any further structural component of the vehicle. the frame unit preferably consists at least partly, preferably to at least a large extent and particularly preferably entirely, of a plastic, of a metal, in particular steel, titanium and/or aluminum, and/or of a composite material, advantageously a fiber composite material, and particularly preferably a fiber composite plastic material, such as for example a carbon fiber-reinforced, mineral fiber-reinforced, aramid fiber-reinforced, a ceramic fiber reinforced and/or advantageously a glass fiber reinforced plastic material. Furthermore, a frame cross-section of the frame unit can have any shape and/or contour, such as for example oval, elliptical, circular, triangular, quadrilateral, hexagonal, octagonal, star-shaped and/or cruciform. The frame unit particularly preferably further comprises, at least in sections, a multilayer structure with at least two and advantageously at least three layers, which advantageously consist of different materials, at least to a large extent. In particular in this case, a "separating unit" shall be understood to mean an advantageously flexibly adjustable and/or modular unit, advantageously a preferably large area top surface unit. The separating unit is advantageously embodied to be of an at least essentially stable shape in this case. As a result, in particular an advantageously flexible and/or stabile vehicle device can be provided.

In addition, it is proposed that for an at least partial prevention of a through-view through the window unit the transparency switching unit comprises at least one preferably electrically controllable and/or actuatable transparency unit, such as for example a polarization film, a polarization filter and/or a liquid crystal film. In particular in this case, the transparency unit can also be embodied as a display and/or an image screen and can be configured for the display of display information. As a result, in particular advantageous flexibility can be achieved. The transparency unit is preferably at least partly, preferably at least to a large extent and particularly preferably entirely arranged between two viewing panes of the window unit. The transparency unit is particularly preferably at least partly embodied in a one-part implementation with a viewing pane of the window unit.

In addition, the invention relates to a method with a vehicle device, in particular an aircraft device, which comprises at least one window unit, wherein a view through the window unit is enabled in at least one first operating state, advantageously at least a de-energized state, in particular a zero-current and/or zero-voltage state.

It is proposed that in at least one second operating state for an at least partial prevention of a view through the window unit, light beams passing through the window unit, in particular from a viewing area that can be viewed by means of the window unit, are superimposed with further light beams, advantageously of at least one illuminating unit. As a result, in particular a flexibility, in particular the design flexibility, can be improved. In addition, the design complexity can advantageously be reduced. Moreover, an efficiency can advantageously be improved, in particular a component efficiency, an installation space efficiency, an energy efficiency and/or a cost efficiency.

The vehicle device and the method with the vehicle device shall not be limited hereby to the application and embodiment described above. In particular, the vehicle device and the method with the vehicle device can comprise a number of single elements, components and units for fulfilling a functionality described herein that is different from a number mentioned herein.

DRAWINGS

Further advantages result from the following drawing description. Two exemplary embodiments of the invention are represented in the drawings. The drawings, the description and the claims contain numerous features in combination. The person skilled in the art will also purposefully consider the features individually and will combine them into further useful combinations.

Figure 2:
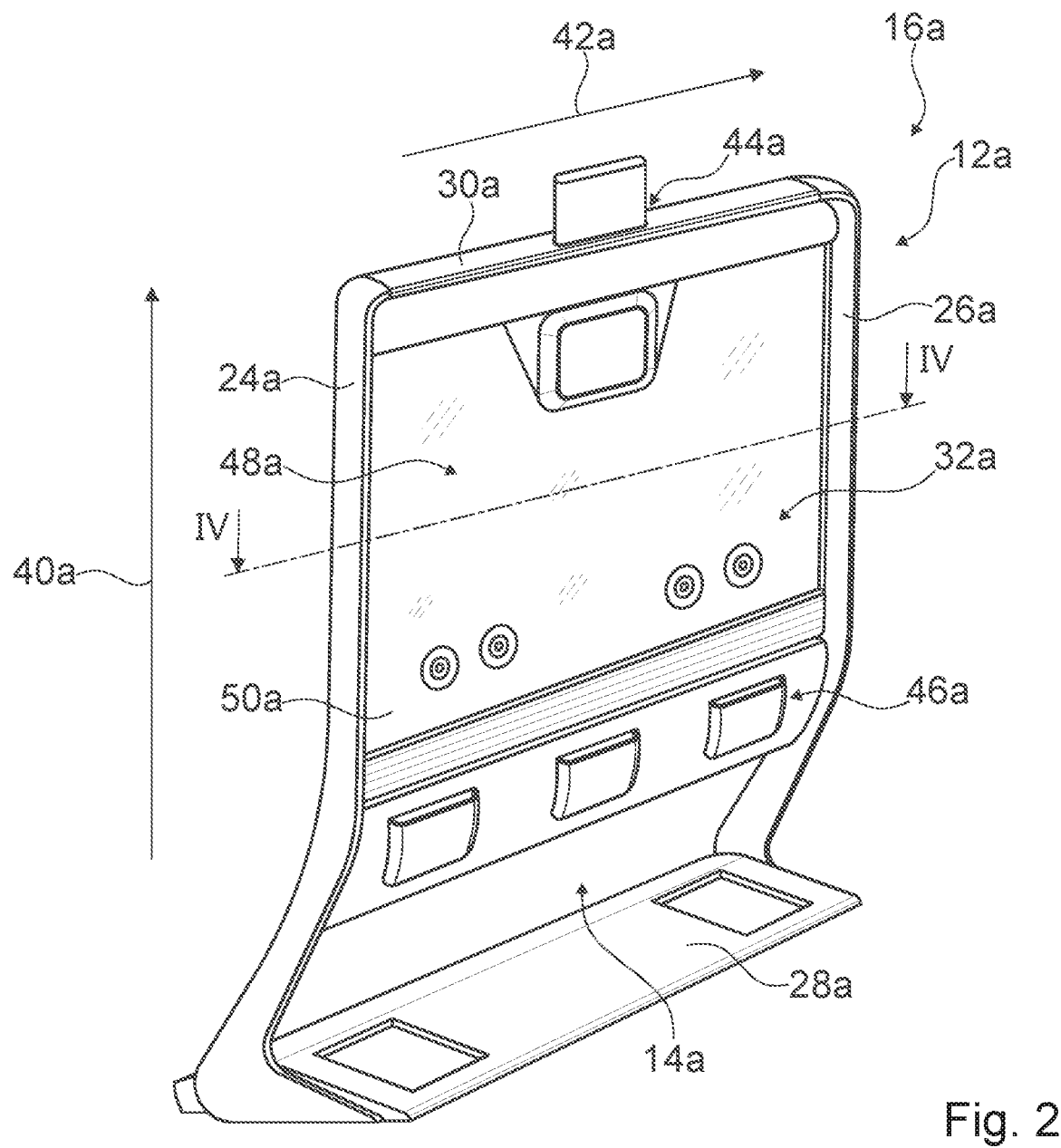
Figure 3:
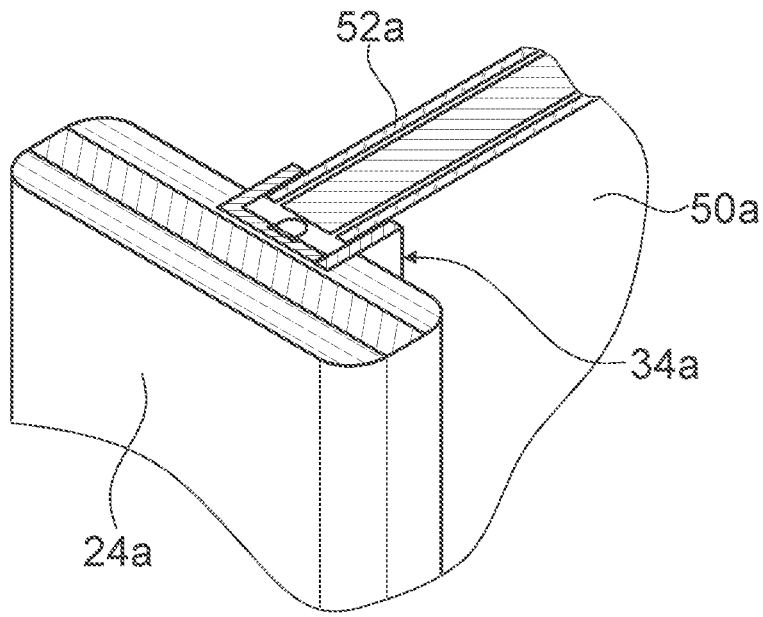
Figure 4:
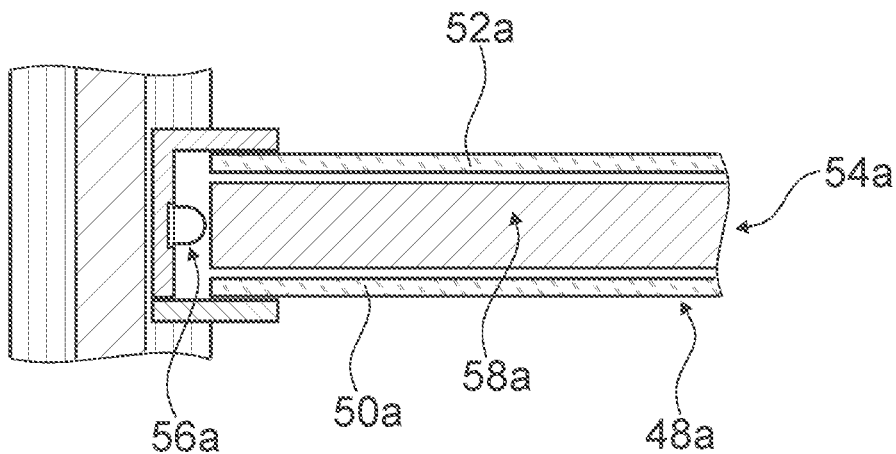
Figure 5:
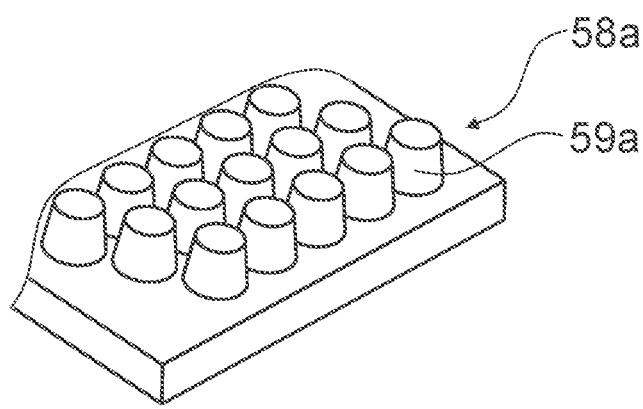
Figure 6:
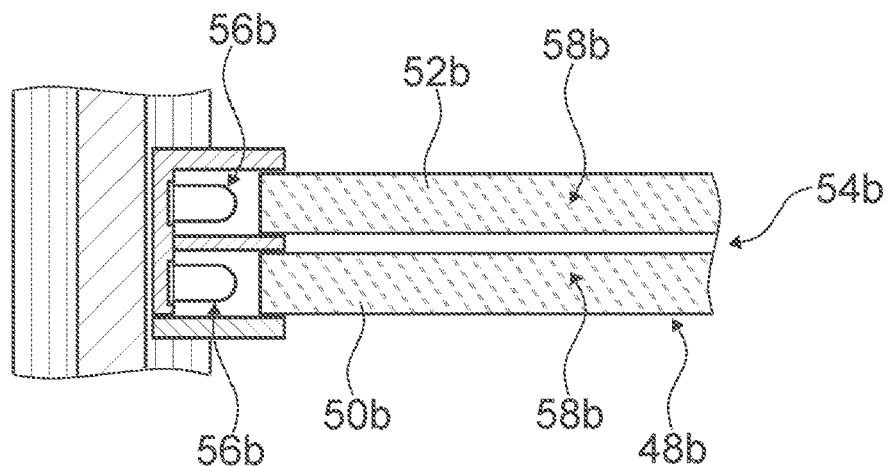
Figure 7:
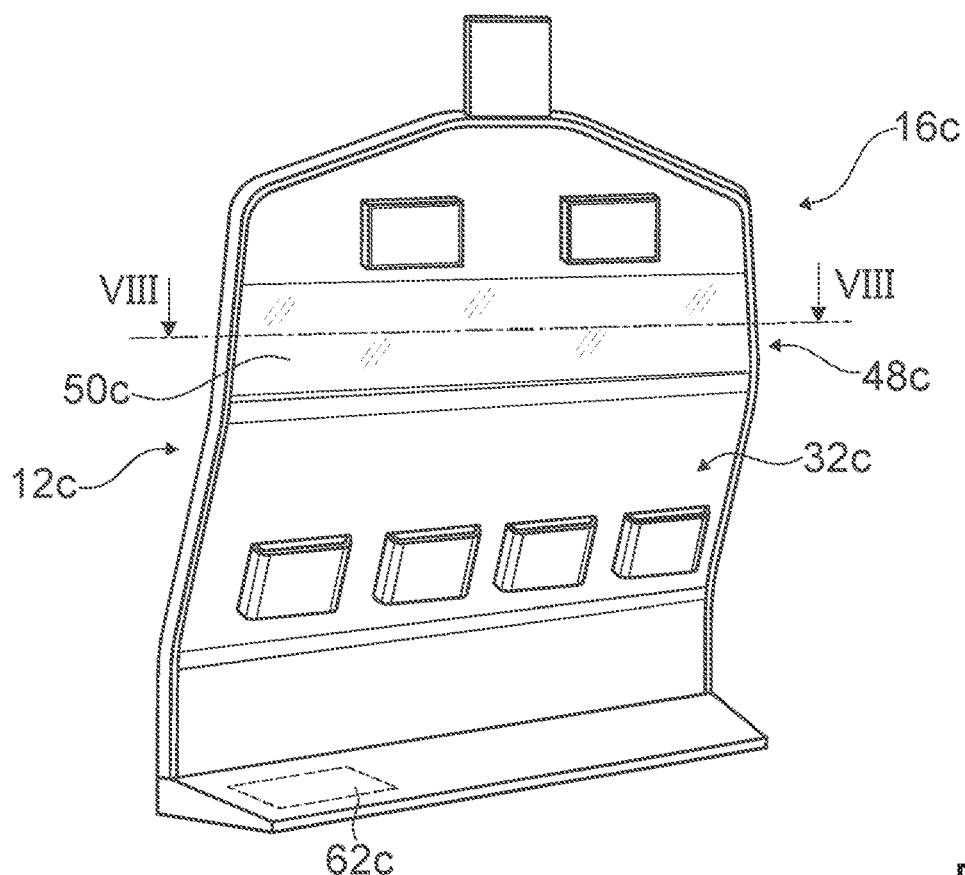
Figure 8:
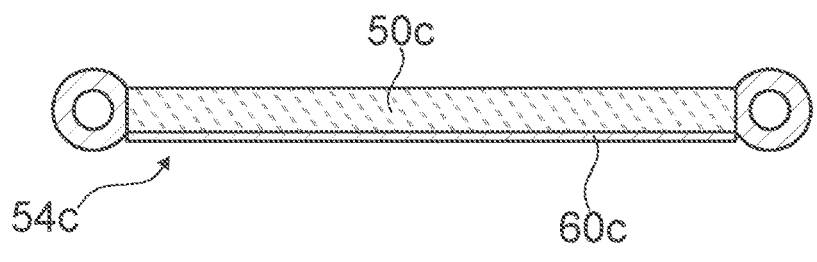

In the figures:

FIG. 1 shows a vehicle embodied as an aircraft with a non-visible vehicle device arranged within the vehicle in a schematic representation, FIG. 2 shows the vehicle device with a partition wall and a window unit integrated in the partition wall in a perspective representation, FIG. 3 shows a fastening unit of the partition wall in a perspective sectional view, FIG. 4 shows the window unit in a sectional view according to the line IV-IV in FIG. 2, FIG. 5 shows a structural unit of a transparency switching unit of the vehicle device in an enlarged representation, FIG. 6 shows a window unit of a further vehicle device in a perspective representation, FIG. 7 shows a partition wall and a window unit of a further vehicle device integrated in the partition wall in a perspective representation and FIG. 8 shows the window unit from FIG. 7 in a sectional view according to the line VIII-VIII in FIG. 7.

DESCRIPTION OF THE EXEMPLARY EMBODIMENTS

FIG. 1 shows a vehicle 10a embodied by way of example as an aircraft in a schematic view. The vehicle 10a is embodied as a passenger aircraft in the present case.

Alternatively however, it is also conceivable that the vehicle is embodied as a transport aircraft, a glider, helicopter and/or an air ship and/or a vehicle as any vehicle that is not an aircraft, in particular as a land vehicle, such as for example as a railway vehicle and/or a motor vehicle, and/or as a waterborne vehicle.

The vehicle 10a comprises a vehicle device (cf. FIG. 2). The vehicle device comprises at least one partition wall 16a. The partition wall 16a is embodied as a vehicle partition wall, in the present case in particular as an aircraft partition wall. The partition wall 16a is configured for installation within a vehicle cabin of the vehicle 10a, in particular on a floor of the cabin of the vehicle 10a. The partition wall 16a is configured to at least partly separate at least two regions from each other. The partition wall 16a is used as a space divider in the present case. Alternatively however, it is also conceivable to suspend a partition wall within a cabin of a vehicle and for example to dispose and/or to fasten the partition wall on top of a side wall and/or a luggage rack. In addition, a partition wall could also be attached to a ceiling of the vehicle, in particular to increase stability. In addition, it is conceivable to completely omit a partition wall.

The partition wall 16a comprises a frame unit 12a. The frame unit 12a comprises a multilayer structure with at least two layers, in the present case in particular three layers. In this case the frame unit 12a is made as a sandwich construction. An inner core layer of the layers consists of a metal, in the present case in particular aluminum. Outer edge layers of the layers consist of plastic in the present case. Also conceivable is an implementation of a frame unit as a hollow profile with any cross-section, whereby in particular a weight saving can be achieved. The frame unit 12a forms a supporting structure. The frame unit 12a is configured for fastening to a supporting structure of the vehicle 10a. The frame unit 12a is different from a supporting structure of the vehicle 10a.

The frame unit 12a defines a main extension plane. In the case of a perpendicular view of the main extension plane, the frame unit 12a comprises an at least essentially rectangular shape and/or contour. In the present case, the frame unit 12a comprises two, in particular opposing side frame elements 24a, 26a that are spaced apart from each other and two, in particular opposing transverse frame elements 28a, 30a that are spaced apart from each other.

The side frame elements 24a, 26a are at least essentially identical to each other. Alternatively however, side frame elements could also be embodied differently, wherein at least one of the side frame elements could advantageously be adapted to a contour of a cabin of a vehicle and/or could copy a contour of the cabin of a vehicle. The side frame elements 24a, 26a are each embodied in one piece. The side frame elements 24a, 26a are embodied as solid profiles. The side frame elements 24a, 26a are at least essentially arranged vertically when fitted, in particular relative to a floor of the vehicle 10a. A main extension direction of the side frame elements 24a, 26a defines a vertical direction 40a in this case.

The transverse frame elements 28a, 30a are significantly different from each other in the present case. The transverse frame elements 28a, 30a are each embodied in a one-part implementation. The transverse frame elements 28a, 30a are arranged at least essentially perpendicular to the side frame elements 24a, 26a when fitted. The transverse frame elements 28a, 30a are arranged at least essentially horizontally, in particular relative to a floor of the vehicle 10a when fitted. A main extension direction of the transverse frame elements 28a, 30a defines a transverse direction 42a in this case. A first transverse frame element 28a of the transverse frame elements 28a, 30a is embodied as a footrest. The first transverse frame element 28a is arranged in a region near the floor, in particular a proximity of a floor of the vehicle 10a when fitted. The first transverse frame element 28a is embodied as a hollow profile. The first transverse frame element 28a is in the present case connected to the side frame elements 24a, 26a in a one-part implementation. A second transverse frame element 30a of the transverse frame elements 28a, 30a is embodied as a terminating element. The second transverse frame element 30a is arranged in a region near the ceiling when fitted, in particular in a proximity of a ceiling of the vehicle 10a. The second transverse frame element 30a is embodied as a solid profile. Also conceivable is an implementation of a second transverse frame element as a hollow profile with any cross-section. The second transverse frame element 30a is in the present case connected to the side frame elements 24a, 26a in a one-part implementation.

The frame unit 12a, in particular the side frame elements 24a, 26a, comprises a vertical extension length when fitted, in particular an extension in the vertical direction 40a, of between 100 cm and 200 cm and advantageously between 140 cm and 180 cm. In the present case, the frame unit 12a comprises a vertical extension length, in particular an extension in the vertical direction 40a, of about 170 cm. Furthermore, the frame unit 12a, in particular the transverse frame elements 28a, 30a, comprises a lateral extension when fitted, in particular an extension in the transverse direction 42a, which is in particular arranged perpendicular to the vertical direction 40a, of between 60 cm and 250 cm and advantageously between 100 cm and 230 cm. In the present case, the frame unit 12a comprises a lateral extension, in particular an extension in the transverse direction 42a, of about 180 cm.

The frame unit 12a defines a separating unit accommodation region 14a when fitted. Alternatively, a frame unit could also consist at least partly of a different metal, such as for example aluminum, steel and/or titanium, a plastic and/or a composite material, advantageously a fiber composite material, such as for example a glass fiber reinforced, carbon fiber reinforced and/or aramid fiber reinforced plastic, advantageously a thermoplastic. In addition, a frame unit could also at least partly consist of an austenitic, rust-proof aircraft material. In this case, a frame unit could in particular also be made in a construction that is different from a sandwich construction and/or embodied as a hollow profile at least in sections. In addition, in a perpendicular view a frame unit could comprise a main extension plane of any shape and/or contour that is different from a rectangular shape and/or contour, such as for example at least essentially triangular, oval and/or circular, and could advantageously reproduce a shape and/or contour of a cabin of a vehicle. In addition, it is conceivable to design a frame unit with just one side frame element and/or just one transverse frame element. A frame unit could also comprise any other number of side frame elements and/or transverse frame elements, such as for example at least three, at least four and/or at least five side frame elements and/or transverse frame elements. In this case in particular, two of the side frame elements and/or transverse frame elements can be embodied as especially outer limiting elements and the further side frame elements and/or transverse frame elements can be embodied as central elements and can advantageously contribute to stabilizing the partition wall device. Moreover, it is conceivable to embody transverse frame elements and side frame elements separately from each other and for example to join them to each other by means of a nonpositive joint and/or a positive joint. In this case, at least one side frame element and/or transverse frame element could in particular also be embodied in multiple parts. In addition, in principle it is conceivable to embody a partition wall without a frame unit.

Moreover, the partition wall 16a comprises a separating unit 32a. The separating unit 32a is embodied to be at least essentially of a stable shape. The separating unit 32a is embodied as a top surface unit. The separating unit 32a defines a further main extension plane. In a perpendicular view of the further main extension plane, the separating unit 32a comprises an at least essentially rectangular contour and/or shape, which is in particular embodied to correspond to the shape and/or contour of the frame unit 12a at least to a large extent. When fitted, the separating unit 32a is arranged in the separating unit accommodation region 14a.

When fitted, the separating unit 32a comprises a vertical extension length, in particular an extension in the vertical direction 40a, which corresponds to at least 30% and no more than 95% of the vertical extension length of the frame unit 12a. In the present case, the vertical extension length of the separating unit 32a corresponds to about 80% of the vertical extension length of the frame unit 12a and thus in particular to about 140 cm. A region of the frame unit 12a close to the floor is free of a separating unit in this case, whereby in particular an advantageous stowage space and/or an advantageous legroom can be achieved. In addition, when fitted the separating unit 32a comprises a lateral extension, in particular an extension in the transverse direction 42a, which at least essentially corresponds to the lateral extension of the frame unit 12a. In the present case, the lateral extension of the separating unit 32a corresponds to about 95% of the lateral extension of the frame unit 12a and thus in particular to about 142 cm.

The separating unit 32a is further embodied as a non-supporting structure. The separating unit 32a is fastened to the frame unit 12a. In this case, the frame unit 12a absorbs at least a large part of a weight, dynamic force and/or externally acting force of the separating unit 32a and passes the same into at least one supporting structure of the vehicle 10a, in the present case in particular a floor and a ceiling of the vehicle 10a. Alternatively however, it is also conceivable that a force is only introduced into a floor, a ceiling or another supporting structure of a vehicle.

Furthermore, in the present case the separating unit 32a comprises at least one window unit 48a. Therefore, in the present case the window unit 48a is integrated within the partition wall 16a. The window unit 48a comprises at least one viewing pane 50a, 52a. In the present case, the window unit 48a comprises two viewing panes 50a, 52a. The viewing panes 50a, 52a are at least essentially identical to each other. The viewing panes 50a, 52a consist of in particular transparent plastic. The viewing panes 50a, 52a are arranged parallel to each other. The viewing panes 50a, 52a are arranged spaced apart from each other. The window unit 48a is used in at least one application state for a view through and/or for a view of a viewing area on the opposite side of the separating unit 32a. In this case, the viewing panes 50a, 52a each extend over at least 75% of a top surface of the partition wall 16a, and in particular the separating unit 32a. In addition, the viewing panes 50a, 52a each extend over at least 90% of a lateral extension of the partition wall 16a. In the present case, the viewing panes 50a, 52a each extend over the entire lateral extent of the separating unit 32a.

Moreover, in the present case the separating unit 32a is at least essentially flexibly adaptable, in particular to different requirements. For this purpose, the separating unit 32a comprises a plurality of functional unit accommodation regions 44a and/or functional units 46a. The functional unit accommodation regions 44a and/or functional units 46a can be embodied as any objects in this case, such as for example as a magazine holder, as an electronics holder, as a holder for a baby bassinet, as a stowage unit, as a display unit, as an entertainment unit and/or as an illuminating unit. Alternatively, a separating unit could also comprise any other shape and/or contour. In addition, a separating unit could be made at least partly shape-flexible, for example by using a film and/or a fabric. Furthermore, a window unit could also comprise just one viewing pane and/or at least three viewing panes. In particular, in this case the viewing panes could also be implemented of glass. In addition, a separating unit could in principle also comprise a plurality of window units, in particular of a small area. Moreover, it is conceivable to omit a functional unit accommodation region and/or a functional unit.

FIG. 3 shows a fastening method for fastening the separating unit 32a to the frame unit 12a. For this purpose the partition wall 16a comprises a fastening unit 34a. The fastening unit 34a is arranged between the separating unit 32a and the frame unit 12a. In this case the fastening unit 34a extends at least to a large extent around an outer contour of the separating unit 32a. The fastening unit 34a is configured at least for positive and/or nonpositive fastening of the separating unit 32a in the present case. Alternatively or additionally, it is conceivable that a fastening unit is configured for a bonded joint of a separating unit to a frame unit.

In particular, in order to increase design flexibility, the vehicle device further comprises a transparency switching unit 54a (cf. in particular FIG. 4). The transparency switching unit 54a is embodied separately from the window unit 48a. Alternatively however, a transparency switching unit could also be embodied at least partly in a one-part implementation with a window unit. The transparency switching unit 54a is configured, in at least one first operating state, to enable a view through the window unit 48a, in particular the viewing panes 50a, 52a, in the present case in particular the entire window unit 48a. Moreover, the transparency switching unit 54a is configured to at least essentially prevent a view through the window unit 48a in at least one second operating state, in particular the viewing panes 50a, 52a, in the present case in particular the entire window unit 48a.

For this purpose, the transparency switching unit 54a comprises at least one illuminating unit 56a. The illuminating unit 56a is different from interior lighting for lighting the cabin of the vehicle 10a. The illuminating unit 56a comprises a number of light emitting diodes in the present case. The illuminating unit 56a is arranged in a proximity of the window unit 48a. The illuminating unit 56a is integrated in the partition wall 16a in the present case. In this case, the illuminating unit 56a is at least partly integrated in the frame unit 12a. In addition, the illuminating unit 56a is at least partly integrated in the window unit 48a. The illuminating unit 56a is arranged between the viewing panes 50a, 52a. The illuminating unit 56a is arranged in an edge region of the window unit 48a. A central region of the window unit 48a is free of an illuminating unit in this case.

Furthermore, in the present case the illuminating unit 56a is embodied as a multi-color light source. The illuminating unit 56a is thus configured to emit light in at least two, in the present case in particular three, different light colors.

In addition, the illuminating unit 56a is configured for at least essentially indirect illumination of the window unit 48a. In this case, the illuminating unit 56a is configured for the emission of light beams that are at least essentially parallel to a main extension plane of the window unit 48a, in particular the viewing panes 50a, 52a. The illuminating unit 56a is configured to radiate light beams into an edge region of the window unit 48a in the present case. Alternatively or additionally, it is conceivable to distribute an illuminating unit over an entire area of a window unit and in particular in an edge region and in a central region of the window unit. In this case an at least essentially transparent illuminating unit can be used advantageously, such as for example a LED film and/or OLED film or similar, which in particular can be configured additionally for displaying at least one item of information, such as for example a text, an image, such as for example a logo, and/or a video. Moreover, it is conceivable to use a single-color illuminating unit and/or to implement an illuminating unit separately from a partition wall and for example to integrate the same within a supporting structure of a vehicle, in particular a floor, a side wall and/or a ceiling. In addition, an illuminating unit could be used for interior lighting, for example for lighting a footwell, and/or as emergency lighting. In this case, it is also conceivable, instead of an illuminating unit with a number of individual light emitting diodes to use an illuminating unit consisting of a single light source, in particular with controllable intensity and/or light color, and a number of optically conducting fibers, each of which in particular conducts a partial light flux of the light source to light outlet points in an edge region of a window unit. Furthermore, symbols, graphics and/or info tables could be introduced into a window unit, for example by means of frosting and/or sand blasting, which is visible with illumination by means of an illuminating unit and invisible in a non-illuminated state.

Moreover, in particular in the present case the transparency switching unit 54a comprises an optically active structural unit 58a, in particular for changing a view through the window unit 48a. The structural unit 58a is embodied with a stable shape. The structural unit 58a is embodied to be transparent. The structural unit 58a consists of plastic in the present case.

The structural unit 58a is arranged in a proximity of the window unit 48a. The structural unit 58a is integrated within the window unit 48a. The structural unit 58a is arranged between the viewing panes 50a, 52a.

The structural unit 58a is illuminated by the illuminating unit 56a in at least one application, in particular at least in the second operating state. In this case, the structural unit 58a is configured to interact with light beams of the illuminating unit 56a. In the present case, the structural unit 58a is configured to influence a light direction of the light beams of the illuminating unit 56a.

In this case the structural unit 58a is configured to superimpose light beams passing through the window unit 48a with the light beams of the illuminating unit 56a and as a result in particular to prevent a view through the window unit 48a. In the present case, the structural unit 58a is configured to deflect the light beams of the illuminating unit 56a such that an exit direction of the light beams of the illuminating unit 56a from the window unit 48a is at least essentially identical to a light direction of light beams passing through the window unit 48a.

For this purpose, the structural unit 58a comprises at least one optically active structural element 59a (cf. in particular FIG. 5). In the present case, the structural unit 58a comprises a number of optically active structural elements 59a. The structural elements 59a extend essentially over the entire area of the window unit 48a, in particular the viewing panes 50a, 52a. The structural elements 59a are embodied as microstructures, in particular as microoptics. The structural elements 59a are embodied to be at least essentially conical frustum-shaped in the present case. The structural elements 59a deflect incident light beams with a defined angle of incidence, in the present case in particular the light beams of the illuminating unit 56a, by an angle of at least 80° and/or no more than 100° relative to the angle of incidence and thereby in particular result in superimposition of the light beams of the illuminating unit 56a with light beams passing through the window unit 48a. Alternatively however, it is also conceivable to completely omit a structural unit, to implement a structural unit in a one-part implementation with a viewing pane and/or to use a fluid unit, in particular with an optically active gas and/or an optically active liquid, in particular alternatively to and/or in addition to a structural unit. Furthermore, a structural unit could consist of any advantageously transparent material that is different from plastic, such as for example glass. In principle, a structural unit could also be arranged on the outside of a viewing pane and/or within a viewing pane. It is also conceivable to use a plurality of structural units and to dispose the same on an outside and an inside of a viewing pane and/or on a plurality of viewing panes. In addition, structural elements could also be embodied to be at least essentially cuboid, trapezoidal, pyramidal, prismatic and/or octahedral. Moreover, a transparency switching unit could in this case additionally comprise a transparency unit, which is in particular electrically actuatable, such as for example a polarization film and/or a liquid crystal film, in particular for an at least partial prevention of a view through a window unit.

In FIGS. 6 through 8, a further exemplary embodiment of the invention is shown. The following descriptions and the drawings are essentially restricted to the differences between the exemplary embodiments, wherein in relation to components with the same designations, in particular in relation to components with the same reference characters, in principle reference can also be made to the drawings and/or the description of the other exemplary embodiment, in particular of FIGS. 1 through 5. To distinguish the exemplary embodiments, the letter a is added to the reference characters of the exemplary embodiment in FIGS. 1 through 5. In the exemplary embodiments in FIGS. 6 through 8 the letter a is replaced by the letters b and c.

The further exemplary embodiment of FIG. 6 differs from the previous exemplary embodiment at least essentially by an embodiment of a transparency switching unit 54b.

In the present case, the transparency switching unit 54b comprises two illuminating units 56b. The illuminating units 56b are arranged at least essentially identically to each other. The illuminating units 56b are arranged spaced apart from each other. The illuminating units 56b are arranged spaced apart from each other in relation to a main extension plane of a frame unit 12b.

Moreover, the transparency switching unit 54b comprises two, in particular optically active structural units 58b, in particular for changing a view through a window unit 48b, whereby two different functions and/or states can advantageously be achieved. A first structural unit 58b of the structural units 58b is embodied in a one-part implementation with a first viewing pane 50b of two viewing panes 50b, 52b. In at least one application, the first structural unit 58b is illuminated by the first illuminating unit 56b of the illuminating units 56b. In this case, the first structural unit 58b is configured to interact with light beams of the first illuminating unit 56b. In the present case, the first structural unit 58b is configured to influence a light direction of the light beams of the first illuminating unit 56b.

A second structural unit 58b of the structural units 58b is embodied in a one-part implementation with a second viewing pane 52b of the viewing panes 50b, 52b. The second structural unit 58b is illuminated by the second illuminating unit 56b of the illuminating units 56b in at least one application. In this case, the second structural unit 58b is configured to interact with light beams of the second illuminating unit 56b. In the present case, the second structural unit 58b is configured to influence a light direction of the light beams of the second illuminating unit 56b.

The further exemplary embodiment of FIGS. 7 and 8 differs from the previous exemplary embodiments at least essentially by an embodiment of a partition wall 16c and/or a transparency switching unit 54c.

In the present case, the partition wall 16c comprises a frame unit 12c embodied as a hollow profile. In addition, a separating unit 32c of the partition wall 16c has a vertical extension length corresponding to a vertical extension length of the frame unit 12c.

Furthermore, a window unit 48c comprises just one viewing pane 50c. In this case the viewing pane 50c extends over about 20% of a top surface of the partition wall 16c and in particular of the separating unit 32c.

Moreover, the transparency switching unit 54c comprises an especially electrically actuatable transparency unit 60c for an at least partial prevention of a view through the window unit 48c. The transparency unit 60c is embodied as a film. The transparency unit 60c is embodied as a liquid crystal film in the present case. The transparency unit 60c is arranged in a proximity of the window unit 48c in this case. The transparency unit 60c is arranged on a viewing area of the viewing pane 50c in the present case and in particular is bonded to the viewing pane 50c. When fitted the transparency unit 60c extends essentially over the entire area of the window unit 48c in this case, in particular of the viewing pane 50c.

Moreover, the transparency unit 60c is embodied as a retrofit unit in the present case and can in particular be attached to the viewing pane 50c when the partition wall 16c is fitted if required.

The transparency unit 60c comprises a working connection, in the present case in particular an electrical connection, to a control unit 62c of the vehicle device. The control unit 62c is configured to control the transparency of the transparency unit 60c. When not actuated and/or not energized, the transparency unit 60c is transparent. In the event of electrical actuation of the transparency unit 60c, the transparency unit 60c is opaque and as a result in particular at least substantially prevents a view through the window unit 48c. Alternatively, it is conceivable to implement a transparency unit as a polarization filter. In addition, a transparency unit could be applied to a viewing pane as a coating. Moreover, a transparency unit could in principle also be arranged between two viewing panes of a window unit, whereby an advantageous protective effect can be achieved. In addition, a transparency switching unit could further also comprise a structural unit. Furthermore, a transparency unit is conceivable with a degree of transparency that can be varied by energy other than an electrical voltage, such as for example thermal energy and/or illumination energy.

The invention claimed is:

1. An aircraft device in an aircraft, comprising:
   a window unit;
   a partition wall in which the window unit is at least partly integrated, the partition wall comprising a frame unit and a separating unit, the separating unit comprising the window unit and being arranged in a separating unit accommodation region of the frame unit; and a transparency switching unit that is, in a first operating state, which is a de-energized state that is a zero current or zero voltage state, configured to enable a view through the window unit, wherein the transparency switching unit comprises an illuminating unit that is configured to at least partly prevent a view through the window unit in a second operating state, wherein the transparency switching unit is free of movable components, wherein the illuminating unit is arranged in a proximity of the window unit, wherein the illuminating unit is different from a vehicle interior illumination unit, wherein the illuminating unit is at least partly integrated in the frame unit, wherein the frame unit is configured to absorb at least a major part of the weight of the separating unit, and wherein the frame unit is different from a supporting structure of the aircraft, including a floor, a ceiling, a side wall, a luggage rack and/or any further structural component of the aircraft.

2. The aircraft device as claimed in claim 1, wherein the illuminating unit is configured for the emission of light beams that are at least essentially parallel to a main extension plane of the window unit.

3. The aircraft device as claimed in claim 1, wherein the transparency switching unit comprises an optically active structural unit for an at least partial prevention of a view through the window unit.

4. The aircraft device as claimed in claim 3, wherein the structural unit is configured to influence a light direction of light beams.

5. The aircraft device as claimed in claim 3, wherein the structural unit is configured to superimpose light beams passing through the window unit with light beams of the illuminating unit.

6. The aircraft device as claimed in claim 3, wherein the window unit comprises a viewing pane, with which the structural unit is embodied at least partly in a one-part implementation.

7. The aircraft device as claimed in claim 1, wherein the window unit comprises a viewing pane that extends over at least 20% of a cover surface of the dividing wall.

8. The aircraft device as claimed in claim 1, wherein the window unit comprises a viewing pane that extends, in a mounted state, over at least 60% of a transverse extension length of the partition wall.

9. An aircraft with a vehicle device as claimed in claim 1.

10. An aircraft device, comprising:

a window unit comprising a viewing pane; and a transparency switching unit that is, in a first operating state, configured to enable a view through the window unit, wherein the transparency switching unit comprises an electrically actuable transparency unit that at least partially prevents a view through the window unit in a second operating state, wherein the transparency unit is a film that is arranged in a proximity of the window unit, wherein the transparency unit comprises a working connection to a control unit of the aircraft device, the control unit being configured to control the transparency of the transparency unit, wherein when not actuated and/or not energized, the transparency unit is transparent, and wherein in the event of electrical actuation of the transparency unit, the transparency unit is opaque.

11. An aircraft device according to claim 10, wherein the transparency unit is a liquid crystal film.

12. An aircraft device according to claim 10, wherein the transparency unit is arranged on a viewing area of the viewing pane.

13. An aircraft device according to claim 10, wherein the transparency unit is bonded to the viewing pane.

14. An aircraft device according to claim 10, wherein the transparency unit is arranged between two viewing panes of the window unit.

15. An aircraft device according to claim 10, wherein the transparency unit extends substantially over the entire area of the viewing pane.

16. An aircraft device according to claim 10, wherein the transparency unit is a retrofit unit.

* * * * *